(No Model.)
J. & J. A. MARSH.
SPINDLE AND BEARING THEREFOR.
No. 253,078. Patented Jan. 31, 1882.
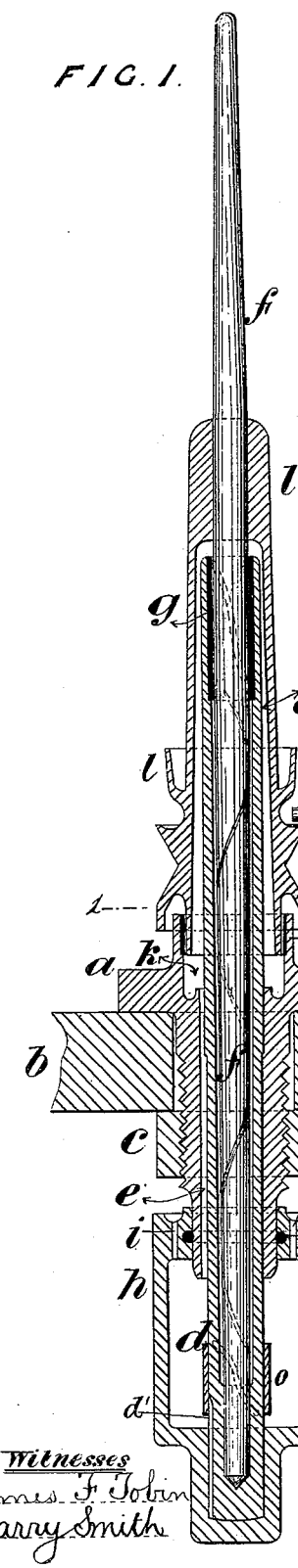
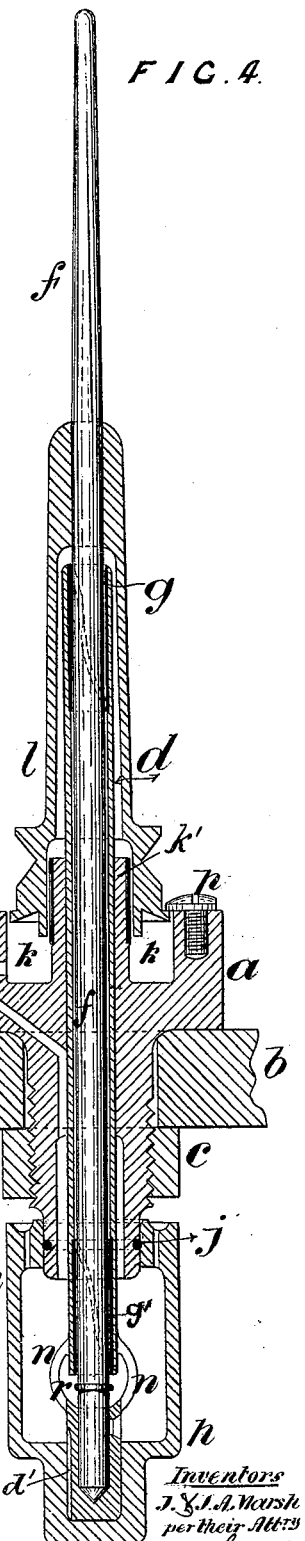
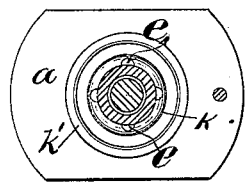
Witnesses
James F. Tobin
Harry Smith
Inventors
J. & J. A. Marsh
per their Att'ys
Howson and Son

UNITED STATES PATENT OFFICE.

JAMES MARSH AND JAMES A. MARSH, OF ASHTON-UNDER-LYNE, COUNTY OF LANCASTER, ENGLAND, ASSIGNORS OF ONE-HALF TO THOMAS HENRY RUSHTON AND BENJAMIN ALFRED DOBSON, OF BOLTON, ENGLAND.

SPINDLE AND BEARING THEREFOR.

SPECIFICATION forming part of Letters Patent No. 253,078, dated January 31, 1882.

Application filed May 23, 1881. (No model.) Patented in England March 17, 1880, in France September 28, 1880, in Belgium September 30, 1880, and in Germany October 3, 1880.

*To all whom it may concern:*

Be it known that we, JAMES MARSH and JAMES ALVIN MARSH, residing at Ashton-under-Lyne, county of Lancaster, England, and subjects of the Queen of Great Britain and Ireland, have invented certain Improvements in Spindles and Bearings therefor, (for which we have obtained a British patent, No. 1,152, March 17, 1880,) of which the following is a specification.

Our invention relates to the spindles employed in spinning and doubling fibrous materials, and to bearings for such spindles, and has for its principal objects to obtain steadiness of action and thorough lubrication of the bearings. We mount the spindle in top and bottom bearings in the upper and lower ends of a long tubular bolster which is fixed in a bolster-carrier, and we apply a removable oil-cup to the lower end of the bolster-carrier. The oil is lifted from the oil-cup to the upper bearing by means of spiral grooves, and, overflowing, returns outside the bolster to a channel in the bolster-carrier, whence it is returned by oil-ducts to the oil-cup. We make the bolster-carrier with or without a settling-chamber. When long sleeves are used we form a bearing lined or covered with anti-friction metal for the lower end of the sleeve.

In the accompanying drawings, Figure 1 is a vertical section, showing a spindle mounted according to our invention; Fig. 2, a sectional plan on the line 1 2, Fig. 1, with the sleeve removed, and showing the bolster-carrier; Fig. 3, a detached view of the lower end of the bolster; Fig. 4, a vertical section, showing a modification of the mounting shown in Fig. 1; Fig. 5, a view of the lower end of the bolster with its shield; and Fig. 6, a view of the retaining-ring for the oil-cup, Figs. 1 and 4.

In Fig. 1, *a* is the bolster-carrier, which is formed with a collar to rest upon the rail *b* of the machine, to which the spindle is applied, and with a shank which projects downward through a hole in the rail, and is screw-threaded to receive a nut, *c*, whereby the carrier is firmly secured in position. The carrier is bored to receive a tubular bolster, *d*, and the bore in the carrier is slotted, drifted, or grooved, so as to form oil-ducts *e e*. The bolster is driven tight into its place in the carrier, the lower end of the bolster projecting below the carrier. The bolster is bored nearly from top to bottom, and at the bottom is formed a footstep-bearing for the spindle *f*. The top end of the bolster is bored to receive a bush, *g*, of German silver or other suitable metal, such bush consisting of a thin shell formed by bending a piece of sheet metal into a cylindrical shape or otherwise suitably formed. A spiral groove is cut through the bush, or is left between the nearly-meeting edges of the bent metal, as indicated by the dotted lines. A spiral groove is also cut in the spindle. The portion of the spindle which extends between the bearing *g* and the footstep is tapered, the bore of the bolster being tapered to correspond. The lower end of the bolster-carrier is turned to receive an oil-cup, *h*, the mouth of which cup is bored to fit the said end, and is channeled to receive a steel ring, *j*, which is separately represented by Fig. 6. The said ring is sprung into the channel in the mouth of the oil-cup, and by clasping the end of the bolster-carrier keeps the cup in position. Air-passages *i i* are drilled in the upper part of the oil-cup, and a groove or slot, *d'*, is also formed in the lower end of the bolster, where it enters the bottom of the cup, so as to allow the air to escape when the cup *h* is being slipped on.

A spiral slot is cut in the lower end of the bolster, as seen in Fig. 3, which is an outside view of such lower end, and on the bolster at this point is fitted a cylindrical metal shield, *o*, which can be turned or slipped upon the bolster so as to cover the slot to any desired extent, Fig. 5. The oil in the cup passes through this slot into the interior of the bolster and lubricates the footstep-bearing, and is also raised by the spiral groove in the spindle to the upper bearing. The spiral cut in the upper bearing works the oil through until it overflows and runs into the recess in a receiver, *k*, which is turned in the upper end of the bolster-carrier. From the receiver *k*, which performs the functions of a sediment-collector, the oil-ducts *e* return the oil to the cup *h*.

In the drawings, a long sleeve, $l$, is fixed upon the spindle; but for some purposes this sleeve would not be required or a shorter sleeve would be used.

The interior of the upper part or shoulder, $k'$, of the receiver $k$ is lined with a bush of German silver or other suitable metal, and the lower end of the sleeve is turned to fit loosely in this bush. When an excessive strain is put upon the sleeve by a tight band the end of the sleeve takes a bearing in the bush.

In Fig. 4 the bolster-carrier $a$ is formed with a second oil-chamber, $m$, communicating with the chamber $k$. The oil overflowing passes first into the chamber $k$, and thence into the outer chamber, $m$, where sediment is deposited, which sediment can from time to time be removed without stopping the spindle. From the chamber $m$ the oil returns to the cup $h$ through an oil-duct, $e$. The chamber $m$ is furnished with a hinged lid, in order that oil may be supplied to the cup $h$ without removing it. The bolster is bushed at both ends, the spiral cut in the lower bush lifting the oil to the upper bearing. The footstep is in a piece which is connected with the lower end of the bolster by means of arms $n$, so that there is a clear space for the admission of oil all around the end of the lower bearing. The steel ring $j$ is sprung into a groove, which is turned in the end of the bolster-carrier. When an excessive strain is put upon the sleeve $l$, Fig. 4, its lower end takes a bearing upon the upper end of a shoulder, $k'$, which projects from the receiver $k$ up within the lower chambered end of the sleeve and fits close around the bolster, its exterior surface being covered with a shell of a suitable anti-friction metal.

To prevent the spindle from being lifted when doffing, we arrange a stop, $p$, consisting in Fig. 1 of a pin and in Fig. 4 of a screw, a portion of the head of which overhangs a flange on the driving whirl or pulley; or, instead of this stop, we may spring a small ring, $r$, on the lower end of the spindle and below the bottom bearing, $g'$, as shown in Fig. 4.

We claim as our invention—

1. The combination of a spindle, carrier, oil-cup $h$, and footstep-bearing, with a bolster having a bush, $g$, at its upper end, provided with a spiral slot, and having at its lower end an opening to admit oil from the cup to the spindle above the bearing, all substantially as set forth.

2. The combination of the spindle, oil-cup $h$, and footstep-bearing, with bolster, leaving a communication between the oil-chamber and spindle, and a bolster-carrier provided with ducts $e$, and a sediment-collector communicating with said ducts.

3. The combination of the spindle, bolster, and footstep-bearing, with oil-cup $h$, and carrier having oil-chambers $k$ and $m$, and oil-ducts $e$, substantially as described.

4. The combination of the spindle, footstep-bearing, bolster, and bearing at the upper end of the bolster, with a sleeve, $l$, and whirl, and the carrier having a shoulder, $k'$, provided with a bushing for the sleeve to bear against, substantially as set forth.

In testimony whereof we have signed our names to this specification in the presence of two subscribing witnesses.

JAMES MARSH.
JAMES ALVIN MARSH.

Witnesses:
EDWARD K. DUTTON,
DAVID FULTON.